United States Patent
Hanaya et al.

(10) Patent No.: US 9,818,551 B2
(45) Date of Patent: Nov. 14, 2017

(54) ADDITIVE FOR ELECTROLYTIC COMPOSITION, ELECTROLYTIC COMPOSITION USING THIS ADDITIVE, AND DYE-SENSITIZED SOLAR CELL

(75) Inventors: Minoru Hanaya, Gunma (JP); Kenji Kakiage, Gunma (JP); Masafumi Unno, Gunma (JP); Toru Yano, Tokyo (JP); Kensaku Akimoto, Tokyo (JP); Koichi Sakamaki, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 291 days.

(21) Appl. No.: 13/819,595

(22) PCT Filed: Sep. 5, 2011

(86) PCT No.: PCT/JP2011/070142
§ 371 (c)(1),
(2), (4) Date: Feb. 27, 2013

(87) PCT Pub. No.: WO2012/036010
PCT Pub. Date: Mar. 22, 2012

(65) Prior Publication Data
US 2013/0161555 A1 Jun. 27, 2013

(30) Foreign Application Priority Data

Sep. 16, 2010 (JP) ................. 2010-207580

(51) Int. Cl.
*H01G 9/035* (2006.01)
*H01G 9/20* (2006.01)

(52) U.S. Cl.
CPC .......... *H01G 9/2004* (2013.01); *H01G 9/035* (2013.01); *H01G 9/2031* (2013.01); *H01G 9/2059* (2013.01); *Y02E 10/542* (2013.01)

(58) Field of Classification Search
CPC ...... H01G 9/2004; H01G 11/54; H01G 11/64; Y02E 10/542
(Continued)

(56) References Cited

U.S. PATENT DOCUMENTS

| 6,911,595 B2 * | 6/2005 | Yoshikawa | .......... C07D 213/76 |
| | | | 136/256 |
| 2006/0162770 A1 * | 7/2006 | Matsui | ................. H01G 9/2031 |
| | | | 136/263 |

(Continued)

FOREIGN PATENT DOCUMENTS

| CN | 101630593 | 1/2010 |
| JP | 2001-283943 | 10/2001 |

(Continued)

OTHER PUBLICATIONS

Kusama et al., Density functional study of alkylpyridine-iodine interaction and its implications in the open-circuit photovoltage of dye-sensitized solar cell, Solar Energy Materials & Solar cells, vol. 90, 2006, p. 953-966.*

(Continued)

*Primary Examiner* — Matthew Martin
*Assistant Examiner* — Dujuan Horton
(74) *Attorney, Agent, or Firm* — Young & Thompson (57) ABSTRACT

Provided are an additive for an electrolytic composition which can suppress the decrease of a short-circuit current and improve an open circuit voltage as compared to the case when conventional 4-TBpy is used as an additive for an electrolytic composition, and an electrolytic composition using this additive and a dye-sensitized solar cell. The additive for an electrolytic composition for use in a dye-sensitized solar cell contains a pyridine derivative having a pyridine ring into which an alkylsilyl group is introduced, and it is preferable that this pyridine derivative has an (Continued)

10 Dye-sensitized solar cell
11 Photoelectrode
12 Counter electrode
13 Electrolytic composition
14a Substrate
14b Electroconductive film
14 Transparent electroconductive substrate
15a TiO₂ particles
15b Porous TiO₂ thin film
15c Sensitizing dye
16a Sunstrate
16b Electroconductive film
16 Transparent electroconductive substrate
17 Platinum alkylsilyl group at the 4-position of the pyridine ring, and it is more preferable that the pyridine derivative is 4-(trimethylsilyl) pyridine.

4 Claims, 4 Drawing Sheets

(58) Field of Classification Search
 USPC .............. 136/263; 252/622; 546/14; 13/263
 See application file for complete search history.

(56) References Cited

U.S. PATENT DOCUMENTS

| | | | |
|---|---|---|---|
| 2006/0186796 A1* | 8/2006 | Yabe | C07D 213/06 313/504 |
| 2009/0065058 A1* | 3/2009 | Kunugi | H01G 9/2013 136/263 |

FOREIGN PATENT DOCUMENTS

| | | |
|---|---|---|
| JP | 2002-050414 | 2/2002 |
| JP | 2009-081074 | 4/2009 |

OTHER PUBLICATIONS

Heilbronner et al., The orbital sequence in methyl and trimethylsilyl substituted pyridines, Helvetica Chimica Acta, vol. 55, 1972, p. 289-302.*
Extended European Search Report dated Sep. 22, 2014, in corresponding European Patent Application No. 11825016.
Sulzbach, R.A. "Darstellung and Eigenschaften von 1,4-Bis(trimethylsilyl)-1,4.dihydropyridin", Journal of Organometallic Chemistry, Elsevier Sequoia S.A., Lausanne, Ch, No. 24, Jan. 1, 1970, pp. 307-314.
Franz Effenberger et al: "Darstellung von Didehydropyridinen aus (Trimethylsilyl)pyrdinen", Chemische Berichte, vol. 124, No. 9, Sep. 1, 1991, pp. 2119-2125.
International Search Report, PCT/JP2011/070142, dated Oct. 11, 2011.

* cited by examiner

[Fig. 1]

10 Dye-sensitized solar cell
11 Photoelectrode
12 Counter electrode
13 Electrolytic composition
14a Substrate
14b Electroconductive film
14 Transparent electroconductive substrate
15a TiO$_2$ particles
15b Porous TiO$_2$ thin film
15c Sensitizing dye
16a Sunstrate
16b Electroconductive film
16 Transparent electroconductive substrate
17 Platinum

→ : Flow of electrons
SCE : Saturated calomel electrode
C. B. : Conduction band of $TiO_2$
HOMO : Highest occupied molecular orbital of sensitizing dye
LUMO : Lowest unoccupied molecular orbital of sensitizing dye

[Fig. 4]

20 Open cell
21 Optical electrode
22 Counter electrode
23 Electrolytic composition
24 Glass with FTO film
25 Dye-adsorbed porous TiO2 thin film
26 Glass with platinum-sputtered FTO film
27 Spacer
27a Window part of spacer
28, 29 Electroconductive tapes

[Fig. 5]

and DYE-SENSITIZED SOLAR CELL

ADDITIVE FOR ELECTROLYTIC COMPOSITION, ELECTROLYTIC COMPOSITION USING THIS ADDITIVE, AND DYE-SENSITIZED SOLAR CELL

TECHNICAL FIELD

The present invention relates to an additive for an electrolytic composition using a pyridine derivative having a pyridine ring into which an alkylsilyl group is introduced, and an electrolytic composition using this additive and a dye-sensitized solar cell.

BACKGROUND ART

A dye-sensitized solar cell has excellent advantages that (1) the production cost thereof is expected to be ⅕ to 1/10 of that of a silicon-based solar cell, and thus is inexpensive, (2) the amount of emission of CO2 during the production thereof is low as 1/10 or less of that of a single crystalline silicon solar cell, (3) the energy payback time or CO2 payback time is short as half or less of that of a polycrystalline silicon solar cell, (4) raw materials are limited little in view of resources, (5) it is excellent in design and processability, and thus the surface area is readily increased, (6) the dye-sensitized solar cell has a relatively high photoelectric conversion efficiency of 10% or more that is comparable to that of an amorphous silicon solar cell, and the like, and therefore developments and studies are actively proceeded as a next-generation solar cell that takes the place of a silicon-based solar cell.

Figure 1:
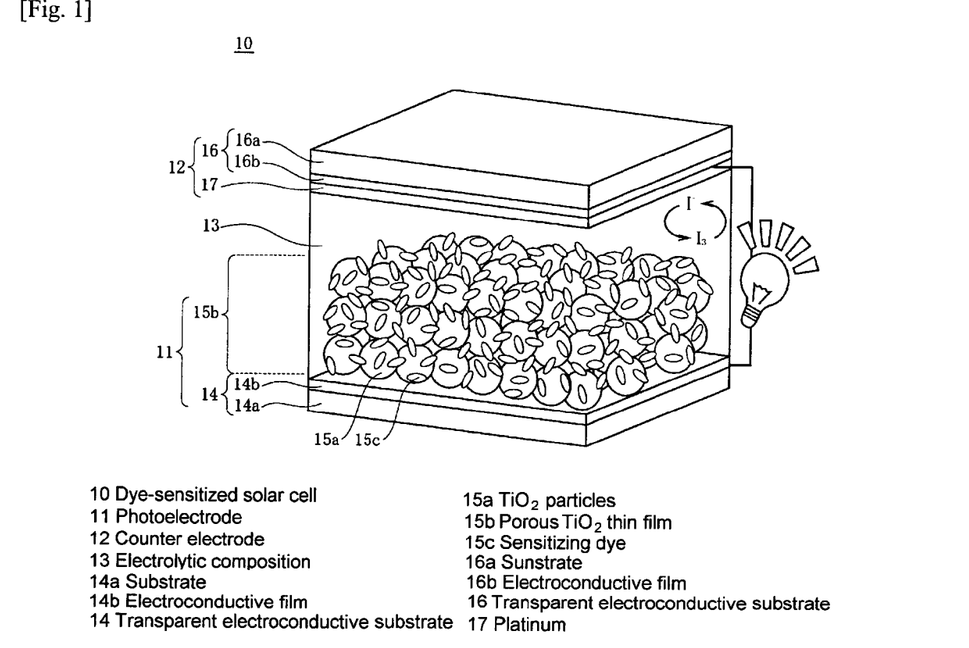
FIG. 1 is a structural scheme of a dye-sensitized solar cell.

As shown in FIG. 1, a dye-sensitized solar cell 10 is constituted by a photoelectrode (photoelectric conversion element) 11 and a counter electrode 12, and an electrolytic composition (electrolyte) part 13 that is interposed between the two electrodes. The photoelectrode 11 is prepared by applying nanosize $TiO_2$ particles 15a to the electroconductive film side of a transparent electroconductive substrate 14 in which an electroconductive film 14b is formed on the surface of a substrate 14a such as glass and calcinating the particles to form a porous $TiO_2$ thin film 15b, and fixing a sensitizing dye 15c on the porous $TiO_2$ thin film 15b by chemical adsorption. The counter electrode 12 is prepared by subjecting the electroconductive film side of a transparent electroconductive substrate 16 in which an electroconductive film 16b is formed on the surface of a substrate 16a such as glass to a treatment with a catalytic amount of platinum 17 or a treatment with electroconductive carbon. A solar cell is prepared by superposing the photoelectrode 11 and counter electrode 12, and injecting the electrolytic composition 13 containing an iodine compound into the gap between the electrodes 11 and 12.

Figure 2:
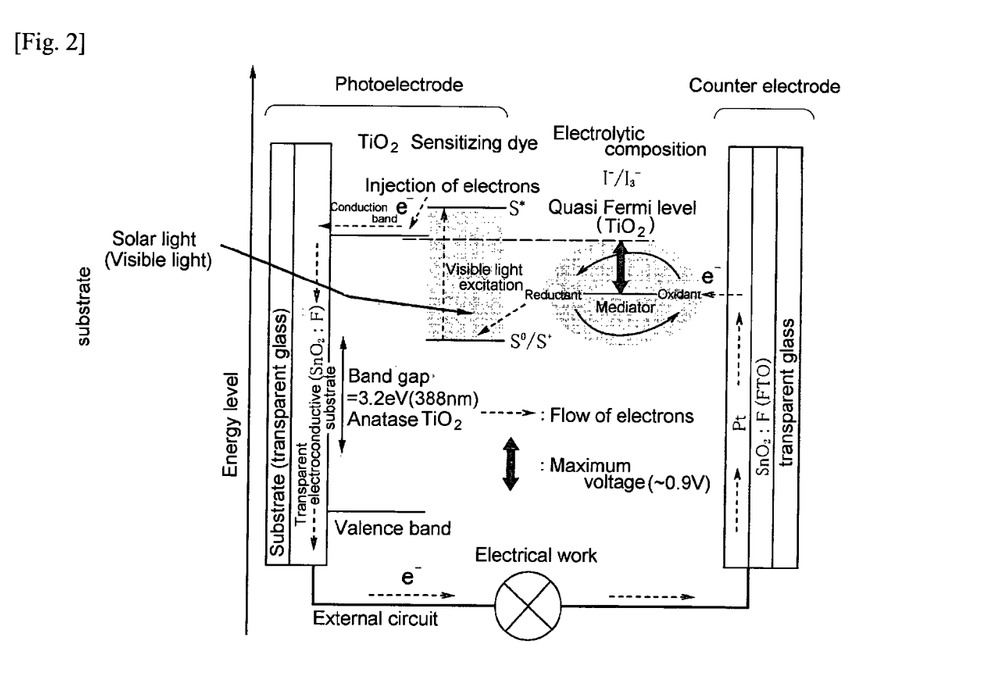
FIG. 2 is a drawing showing the power generation mechanism of a dye-sensitized solar cell.

Furthermore, as shown in FIG. 2, the power generation mechanism of a dye-sensitized solar cell is that electrons are injected from a sensitizing dye that has been excited by irradiation of solar light (visible light) to a conduction band of $TiO_2$, the injected electrons are brought to an external circuit through a photoelectrode and transferred to a counter electrode, and the sensitizing dye (dye cation) in an oxidized state receives and recovers the electrons through a redox reaction of the electrolytic composition. By this cycle, photoelectric conversion is achieved.

Figure 3:
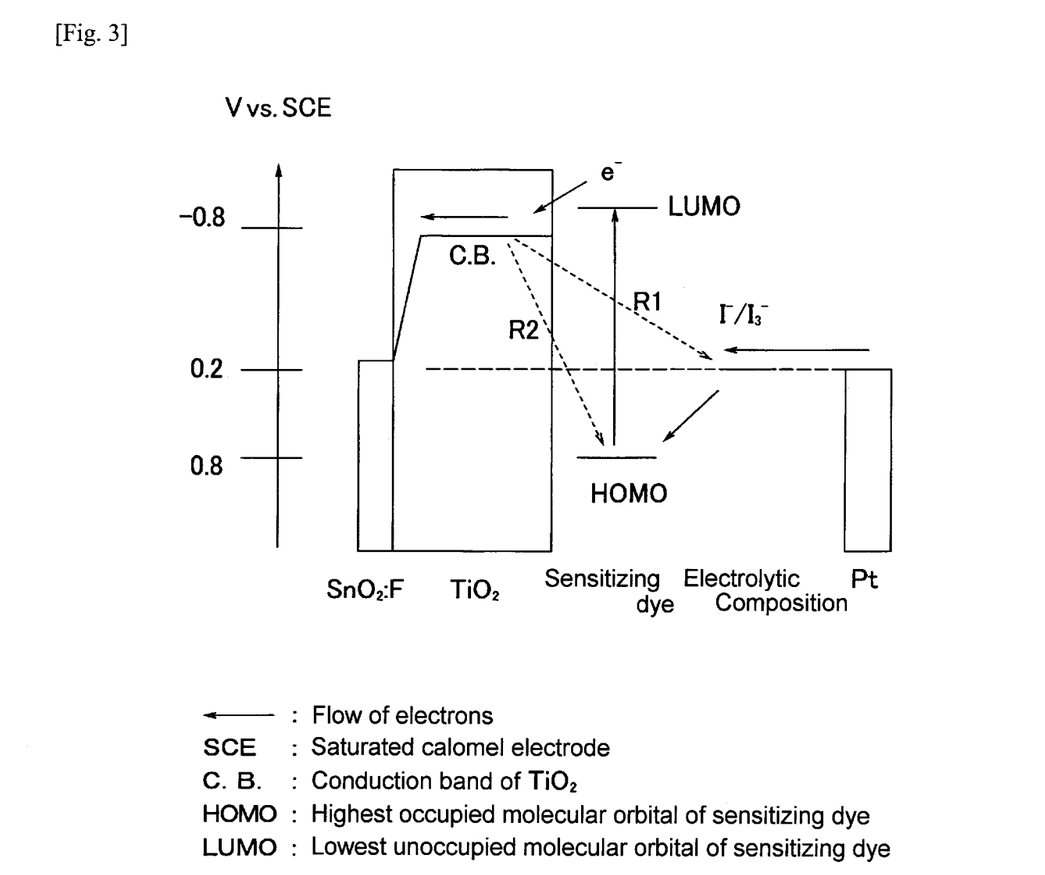
FIG. 3 is a drawing showing the charge transfer process in a dye-sensitized solar cell.

However, a dye-sensitized solar cell has not been put into practical use yet since it has a lower photoelectric conversion efficiency than those of silicon-based solar cells that are commercially available at present. The main cause of the decrease of the photoelectric conversion efficiency of a dye-sensitized solar cell resides in the decrease of a voltage due to reverse electron transfer from a $TiO_2$ layer to an electrolytic composition and dye cation (see FIG. 3), and in order to suppress reverse electron transfer to prevent voltage descending, addition of a basic heterocyclic compound to an electrolytic composition is studied. R1 and R2 in FIG. 3 represent reverse electron transfer (charge recombination).

Currently, 4-tert-butylpyridine (4-TBpy) is known as an additive for an electrolytic composition which is the most effective in the improvement of the conversion efficiencies of dye-sensitized solar cells. In the case when 4-TBpy is added as an additive for an electrolytic composition to an electrolytic composition, the increase of an open circuit voltage and the improvement of a fill factor occur, and a photoelectric conversion efficiency, that is calculated by multiplying a short-circuit current, an open circuit voltage and a fill factor, rises.

However, since an open circuit voltage increases but a short-circuit current decreases in 4-TBpy, a photoelectric conversion efficiency could not be significantly improved. Therefore, an additive for an electrolytic composition which can suppress the decrease of a short-circuit current and improve an open circuit voltage and a fill factor has been required.

As the above-mentioned additive for an electrolytic composition that takes the place of 4-TBpy, use of an additive for an electrolytic composition containing a compound having at least one or more of isocyanate group is disclosed (for example, see Patent Literature 1). According to the above-mentioned Patent Literature 1, by using the compound having at least one or more of isocyanate group, an open circuit voltage can be improved without causing significant decrease in a short-circuit current in a dye-sensitized photoelectric conversion element, thereby a photoelectric conversion efficiency can be improved.

CITATION LIST

Patent Literature

Patent Literature 1: JP 2009-81074 A (claims 1, 8 and 13, and paragraph [0027])

SUMMARY OF INVENTION

Technical Problem

However, in the case when the above-mentioned conventional compound having at least one or more of isocyanate group shown in Patent Literature 1 is used as an additive for an electrolytic composition, co-addition of an amine-based compound such as 4-TBpy is necessary, and the compound had a defect that a short-circuit current is decreased by 9 to 22% and a problem that the compound having at least one or more of isocyanate group is chemically unstable and thus easily reacts with water to decompose.

The present invention aims at providing an additive for an electrolytic composition which can suppress decrease of a short-circuit current and improve an open circuit voltage as compared to the case when conventional 4-TBpy is used as an additive for an electrolytic composition, and an electrolytic composition using this additive and a dye-sensitized solar cell.

Solution to Problem

According to a first aspect of the present invention, an additive for an electrolytic composition for use in a dye-sensitized solar cell contains a pyridine derivative having a pyridine ring into which an alkylsilyl group is introduced.

In the invention based on the first aspect of the present invention, the pyridine derivative has an alkylsilyl group at the 4-position of the pyridine ring according to a second aspect of the present invention.

In the invention based on the first or second aspect of the present invention, the pyridine derivative is 4-(trimethylsilyl)pyridine according to a third aspect of the present invention.

According to a fourth aspect of the present invention, an electrolytic composition for use in a dye-sensitized solar cell is provided by adding an additive for an electrolytic composition containing a pyridine derivative having a pyridine ring into which an alkylsilyl group is introduced.

In the invention based on the fourth aspect of the present invention, the pyridine derivative has an alkylsilyl group at the 4-position of the pyridine ring according to a fifth aspect of the present invention.

In the invention based on the fourth or fifth aspect of the present invention, the pyridine derivative is 4-(trimethylsilyl)pyridine according to a sixth aspect.

According to a seventh aspect of the present invention, a dye-sensitized solar cell uses an electrolytic composition to which an additive for an electrolytic composition containing a pyridine derivative having a pyridine ring into which an alkylsilyl group is introduced.

In the invention based on the seventh aspect of the present invention, the pyridine derivative has an alkylsilyl group at the 4-position of the pyridine ring according to an eighth aspect of the present invention.

In the invention based on the seventh or eighth aspect of the present invention, the pyridine derivative is 4-(trimethylsilyl)pyridine according to a ninth aspect of the present invention.

Advantageous Effects of Invention

In the first aspect of the present invention, the pyridine derivative having a pyridine ring into which an alkylsilyl group is introduced suppresses decrease in a short-circuit current and improves an open circuit voltage as compared to the case when conventional 4-TBpy is used as an additive for an electrolytic composition, for the reasons such as the increase of an electric dipole moment, the increase of a molecular size, the rising of an HOMO level, and the like by the introduction of an alkylsilyl group into the pyridine ring, and consequently, a high photoelectric conversion efficiency can be obtained.

DESCRIPTION OF EMBODIMENTS

Next, the embodiments for carrying out the present invention will be explained based on the drawings.

<Electrolytic Composition and Additives Therefor>

As an electrolytic composition in a dye-sensitized solar cell, a composition containing an iodine redox ($I_3^-/I^-$) in an organic solvent is generally used. Various studies aiming at improving a photoelectric conversion efficiency by adding a basic compound to this composition have been done. For example, heterocyclic compounds such as pyridine derivatives, pyrimidine derivatives, aminopyridine derivatives, quinoline derivatives, imidazole derivatives, benzimidazole derivatives, pyrazole derivatives, aminotriazole derivatives and aminothiazole derivatives have been considered until now, and 4-TBpy has been well-known to date as the most effective additive for an electrolytic composition for improving the conversion efficiency of a dye-sensitized solar cell.

Generally, in the case when 4-TBpy is added to an electrolytic composition, a short-circuit current is decreased whereas increase in an open circuit voltage and improvement of a fill factor occur, and a photoelectric conversion efficiency that is calculated from a product of the short-circuit current, open circuit voltage and fill factor is improved.

It is considered that 4-TBpy added to an electrolytic composition in a dye-sensitized solar cell is adsorbed by a Ti atom on the surface of $TiO_2$ (the part where a sensitizing dye has not been adsorbed) due to an $sp^2$ hybridized nitrogen atom on which a lone electron pair is localized. To date, many experimental or theoretical considerations have been made on the effect of addition of 4-TBpy to an electrolytic composition, but the whole truth thereof has not been clarified yet. Until now, the effect of addition of 4-TBpy in the improvement of the efficiency of a dye-sensitized solar cell is mainly summarized in the following four points.

(1) As a result of the adsorption of 4-TBpy on the surface of the $TiO_2$ nanoparticle, the contact of the $TiO_2$ surface with the electron acceptor electrolyte ($I_3^-$) is physically blocked, thereby charge recombination (reverse electron transfer from $TiO_2$ to $I_3^-$; leak current) is suppressed.

(2) As a result of the adsorption of 4-TBpy on the surface of the $TiO_2$ nanoparticle, the potential of the conduction band edge (CBE) of $TiO_2$ shifts to the negative side by the basicity of 4-TBpy. Furthermore, in the case when $Li^+$ ion is included as counter cation in the electrolytic composition (added as LiI to the electrolytic composition), $Li^+$ is adsorbed or intercalated by $TiO_2$ to shift the CBE potential of $TiO_2$ to the positive side, but 4-TBpy is considered to block the interaction between $Li^+$ and $TiO_2$. As a result thereof, an open circuit voltage (=|Vf-Vred|) that is defined by the difference between the CBE level (correctly Fermi level; VD of $TiO_2$ and the redox potential (Vred) of a redox mediator is improved by the addition of 4-TBpy.

However, in the case when the potential of CBE is shifted to the negative side, the change of free energy ($-\Delta G_{inj}$) in the injection of electrons from the excited dye to the $TiO_2$ conduction band represented by the following formula (1) is decreased:

[Math. 1]

$$-\Delta G_{inj} = E_{cb(TiO2)} - E_{LUMO(dye)} \left( \text{Example: } \begin{matrix} E_{cb(TiO2)} = -0.7 \\ E_{LUMO(dye)} = -1.0 \end{matrix} \text{ vs. } SCE \right) \quad (1)$$

Generally, since it is reported that a higher electron injection efficiency from a dye to $TiO_2$ can be obtained at higher −ΔGinj, and thus addition of 4-TBpy causes decrease in a current value due to decrease in −ΔGinj.

(3) 4-TBpy and an iodine molecule form a charge transfer complex of 1:1. It has been clarified by density functional calculation that the σ* orbit of the iodine and the lone electron pair of the nitrogen on the pyridine ring interact in this complex. Here, as shown in the following formula (2), as a result of formation of a charge transfer complex (4-TBpy)I$_2$, the concentration of the electron receptor electrolyte (I$_3^-$) on the TiO$_2$ surface decreases, thereby reverse electron transfer from TiO$_2$ to I$_3^-$ is suppressed. As a result thereof, the open circuit voltage is improved.

[Math. 2]

$$(4\text{-TBpy}) + I_3^- \leftrightarrows (4\text{-TBpy})\,I_2 + I^- \qquad (2)$$

(4) As a result of the adsorption of 4-TBpy on the surface of TiO$_2$ nanoparticle, the TiO$_2$ surface is negatively charged. Therefore, the electrons injected from the excited dye are removed from the TiO$_2$ surface by electrostatic repulsion, and the reverse electron transfer from TiO$_2$ to I$_3^-$ is suppressed. As a result thereof, the open circuit voltage is improved.

However, as mentioned above, since the open circuit voltage is improved but the short-circuit current is decreased by 4-TBpy, the photoelectric conversion efficiency could not be significantly improved.

Therefore, an additive for an electrolytic composition which can suppress the decrease of a short-circuit current and improve an open circuit voltage has been required.

Therefore, the present inventors have focused on this additive for an electrolytic composition and done intensive studies, and found that decrease in a short-circuit current can be suppressed and an open circuit voltage can be improved by using a pyridine derivative having a pyridine ring into which an alkylsilyl group is introduced as an additive for an electrolytic composition as compared to use of 4-TBpy, and thereby completed the present invention.

The additive for an electrolytic composition used in the dye-sensitized solar cell of the present invention contains a pyridine derivative having a pyridine ring into which an alkylsilyl group is introduced. Of which, it is preferable that the pyridine derivative has an alkylsilyl group at the 4-position of the pyridine ring, and it is specifically preferable that the pyridine derivative is 4-(trimethylsilyl)pyridine (hereinafter referred to as 4-TMSpy).

In such case when an alkylsilyl group is introduced into a pyridine ring, since the covalent bond radius of a silicon element is larger than that of a carbon element, it is possible to decrease the physical contact between the TiO$_2$ surface and electron receptor electrolyte (I$_3^-$) more effectively than the case when an alkyl group is introduced into a pyridine ring such as 4-TBpy; consequently, reverse electron transfer from TiO$_2$ to I$_3^-$ is suppressed, and the open circuit voltage can be improved. Furthermore, since the molecular size is large, the amount of adsorption on the TiO$_2$ surface is smaller than that in the case of 4-TBpy and the shifting of the potential of the conduction band edge (CBE) of TiO$_2$ to the negative side is suitably suppressed, the decrease of the short-circuit current can be suppressed.

Furthermore, an alkylsilyl group has a larger interaction with an aromatic ring π-electron system than that of an alkyl group, and expresses σ-π conjugation with an aromatic ring to increase an HOMO level and enhance the electron-donating property of the aromatic ring to thereby efficiently form a charge transfer complex of an alkylsilyl pyridine and an iodine molecule. By this way, the concentration of the electron receptor electrolyte (I$_3^-$) on the TiO$_2$ surface is decreased, and as a result thereof, the reverse electron transfer from TiO$_2$ to I$_3^-$ is suppressed and thus an open circuit voltage can be improved.

Next, the method for the production of 4-TMSpy included in the additive for an electrolytic composition of the present invention will be explained.

4-TMSpy that is the additive for an electrolytic composition of the present invention can be synthesized by a method shown in the following formula (Scheme 1) using pyridine as a starting substance.

Scheme 1

[Chem. 1]

Furthermore, it is possible to synthesize with a higher yield than that in the case of the synthesis method according to the above-mentioned Scheme 1, by using a method shown in the following formula (Scheme 2) using a halogenated pyridine as a starting substance which is a general reaction for introducing a silicon substituent into an aromatic ring.

Scheme 2

[Chem. 2]

The synthesis method according to Scheme 2 is explained here. First, under an argon atmosphere, lithiation (a lithium-halogen exchange reaction) of 4-bromopyridine is conducted by cooling a suspension solution of 4-bromopyridine hydrochloride in diethyl ether to −78° C., gradually adding dropwise a solution of n-butyllithium in hexane thereto, and stirring for 1 hour. Next, chlorotrimethylsilane is gradually added dropwise to this reaction solution, cooling is stopped, and stirring is conducted at a temperature range from −78° C. to room temperature for about 3 to 5 hours, thereby the intended product 4-TMSpy can be obtained. The sample can be purified by column chromatography using SiO$_2$. Furthermore, the structure of the compound can be determined by various spectrometries ($^1$H NMR, IR, UV).

In addition, in the above-mentioned Scheme 2, a pyridine derivative in which an alkylsilyl group is introduced into a different position can be synthesized by using a starting substance in which the substitution position of the bromo group is changed.

<Method for Producing Dye-Sensitized Solar Cell>

Next, a method for producing a dye-sensitized solar cell using the above-mentioned additive for an electrolytic composition will be explained.

First, as shown in FIG. 1, a dispersion paste of TiO$_2$ nanoparticles is applied to a transparent electroconductive substrate 14 having optical transparency and dried, and calcinated to prepare a porous TiO$_2$ thin film.

As the transparent electroconductive substrate 14 having optical transparency, a substrate in which an electroconductive film 14b such as a film of fluorine-doped tin oxide (FTO) or a film in which a small amount of tin oxide is mixed with indium oxide (an ITO film) is formed by a deposition process, a sputtering process, an ion plating process, a hydrolysis process or the like on one surface, both surfaces or all surfaces of a substrate 14a such as a glass plate having optical transparency and a plastic film having optical transparency and having flexibility is preferable. The electroconductive film 14b preferably has a surface resistance of 20 Ω/□ or less.

Furthermore, the dispersion paste of TiO$_2$ nanoparticles is prepared by the following method. Although the TiO$_2$ nanoparticles as used is not specifically limited, particles each having an anatase-type crystal structure are preferable for the reason that the conduction band has a high energy level and thus a high photovoltage can be obtained. Furthermore, the TiO$_2$ nanoparticles are preferably a powder containing 5 to 50% by weight of a powder having an average particle size of 100 to 500 nm in a powder having an average particle size of 5 to 30 nm, for the reason of improvement of a light absorption efficiency due to light scattering. The dispersion paste of TiO$_2$ nanoparticles is prepared by preparing a dispersion liquid by adding the TiO$_2$ nanoparticles to an aqueous solvent and mixing, adding to this dispersion liquid a thickening agent, a dispersing agent and the like and homogeneously mixing. In the mixing used herein, an ultrasonic treatment may also be conducted.

In the case when a glass plate is used as the substrate 14a, the above-mentioned dispersion paste of TiO$_2$ nanoparticles is applied to an electroconductive film 14b of the substrate 14a by a doctor blade process, a squeegee process, a spin coating process, a screen printing process or the like and dried, and the substrate is put into an electric furnace, and calcinated by retaining in the air at 400 to 550° C. for 30 to 60 minutes to form a porous TiO$_2$ thin film 15b on the electroconductive film 14b. The reason why the calcination temperature is 400 to 550° C. is that, when the temperature is lower than the lower limit value, there is a defect that a high photoelectric conversion property cannot be obtained since organic additives and the like remain to inhibit adsorption of the dye, or sintering of the TiO$_2$ nanoparticles themselves is insufficient, whereas when the temperature exceeds the upper limit value, there is a defect that the preparation of the photoelectrode is interfered with the softening of the substrate or increase in the electrical resistance of the electroconductive film 14b. Furthermore, the reason why the calcination time is 30 to 60 minutes is that there is a defect that sintering failure occurs at lower than the lower limit value, whereas there is a defect that the particles grow too significant by calcination and the specific surface area decreases at more than the upper limit value.

Furthermore, in the case when a plastic film is used as the substrate 14a, the porous TiO$_2$ thin film 15b is formed on the electroconductive film 14b by applying the above-mentioned dispersion paste of TiO$_2$ nanoparticles to the electroconductive film 14b of the substrate 14a by a squeezee process, a screen printing process, an electrodeposition process, a spraying process, a DJP (Direct jet printing) process or the like, press-forming where necessary, and irradiating microwave or the like.

Next, a sensitizing dye 15c is adsorbed by the porous TiO$_2$ thin film 15b formed on the electroconductive film14b and fixed. The dye 15c as used is not specifically limited as long as it shows a sensitizing action, and examples may include ruthenium complex systems, an indoline-based dyes and the like.

Although the method for adsorbing the dye 15c on the porous TiO$_2$ thin film 15b is not specifically limited, a method including preparing a dye solution by dissolving the above-mentioned dye 15c in a solvent, and immersing the transparent electroconductive substrate 14 in which the porous TiO$_2$ thin film 15b is prepared on the electroconductive film 14b in this dye solution, and a method including applying a dye solution to the porous TiO$_2$ thin film 15b may be exemplified. As the solvent used for the preparation of the dye solution, single solvents such as acetonitrile, ethanol, t-butylalcohol and tetrahydrofuran, or mixed solvents thereof may be exemplified. The dye concentration in the solution is preferably 0.1 to 10 mmol/L. In the case when the transparent electroconductive substrate 14 is immersed in the dye solution, it is preferable to conduct under 20 to 80° C. for about 1 to 72 hours. Furthermore, the surface of the porous TiO$_2$ thin film 15b on which the above-mentioned dye 15c is adsorbed is washed, and thereafter dried.

By this way, as shown in FIG. 1, the photoelectrode 11 including the transparent electroconductive substrate 14 having optical transparency, and the porous TiO$_2$ thin film 15b constituted by the TiO$_2$ particles 15a on which the dye 15c is adsorbed and formed on this transparent electroconductive substrate 14 can be obtained.

Next, a counter electrode 12 is prepared by subjecting the electroconductive film side of a transparent electroconductive substrate 16 in which an electroconductive film 16b is formed on a substrate 16a to a treatment with a catalytic amount of platinum 17 or an electroconductive carbon treatment. The electroconductive film 16b is formed on one surface, both surfaces or all surfaces of the substrate 16a by an electrodeposition process, a sputtering process, an ion plating process, a hydrolysis process or the like. As the substrate 16a, use of a glass plate or a flexible plastic film is preferable, and as the electroconductive film 16b, it is preferable to use a platinum foil, a film of fluorine-doped tin oxide (FTO), or use of a film formed by mixing indium oxide with a small amount of tin oxide (ITO film) or the like. The platinum 17 is formed by a sputtering process, an electrodeposition process or the like.

Furthermore, an electrolytic composition 13 is retained between the photoelectrode 11 and counter electrode 12 in a state that the electrodes 11 and 12 face each other across a predetermined interval.

The electrolytic composition 13 is prepared by mixing a support electrolyte containing cation such as lithium ion and anion such as iodine ion, a redox pair that is present in this support electrolyte such as an iodine-iodine compound and a bromine-bromine compound, the additive for an electrolytic composition of the present invention, and a single solvent or mixed solvent of alcohol-based solvents (ethanol, t-butylalcohol), nitrile-based solvents (acetonitrile, methoxyacetonitrile, 3-methoxypropionitrile) or carbonate ester-based solvents (ethylene carbonate, ethyl carbonate, methyl carbonate) and the like. The concentration of the support electrolyte is preferably 0.1 to 1 mol/L with respect to the solvent. Furthermore, the concentration of the additive for an electrolytic composition is preferably 0.1 to 1 mol/L with respect to the solvent. In addition, in order to retain the interval between the photoelectrode 11 and counter electrode 12 at a predetermined value, a spacer having a thickness of 10 to 30 μm with a window part formed on the center part (not depicted) is interposed between the electrodes 11 and 12, and the electrolytic composition 13 is retained in the gap between the electrodes 11 and 12. Furthermore, in order to prevent leakage of the above-mentioned electrolytic composition 13, an electrical insulating adhesive such as an epoxy resin is applied to the peripherary of the gap between the electrodes 11 and 12 and cured. By this way, a dye-sensitized solar cell 10 is prepared.

Since a pyridine derivative having a pyridine ring into which an alkylsilyl group is introduced is used as an additive for an electrolytic composition in the dye-sensitized solar cell having the above-mentioned structure, the decrease of a short-circuit current is suppressed and an open circuit voltage is improved as compared to the case when conventional 4-TBpy is used as an additive for an electrolytic composition, for the reasons such as the increase of an electric dipole moment, the increase of a molecular size, the rising of an HOMO level, and the like by the introduction of an alkylsilyl group into the pyridine ring, and as a result thereof, a high photoelectric conversion efficiency can be obtained.

EXAMPLES

Next, Examples of the present invention will be explained in detail together with Comparative Examples.

Example 1 and Comparative Example 1

<Preparation of Dispersion paste of $TiO_2$ Nanoparticles>
Preparation of Paste for Spin Coating (SC Paste)

First, P-25 (manufactured by Nippon Aerosil Co., Ltd.) for which high dispersion property was reported was selected as $TiO_2$ nanoparticles. P-25 has a crystal structure ratio of anatase:rutile=8:2, an average particle size of 21 nm and a BET surface area of 50 $m^2/g$. Next, an operation for dispersing was conducted in a mixed liquid containing 70 mL of ion exchanged water, 0.2 mL of nitric acid, 31 g of $TiO_2$ nanoparticles, 1.5 mL of acetylacetone and 0.5 g of a nonionic surfactant (Triton X-100) as components using a homogenizer, thereby an SC paste containing $TiO_2$ nanoparticles dispersed therein was prepared.
Preparation of Paste for Screen Printing (SP Paste)

First, as $TiO_2$ nanoparticles, mixed particles formed by mixing P-25 for which high dispersion property was reported (manufactured by Nippon Aerosil Co., Ltd.), ST-21 that has some flocculating property as compared to the above-mentioned P-25 (manufactured by Ishihara Sangyo Kaisha, Ltd.), AMT-600 (manufactured by TAYCA), and TITANIX JA-1 that has a relatively large particle size of 100 nm or more (manufactured by TAYCA) at a predetermined ratio was selected. ST-21 has a crystal structure ratio of anatase 100%, an average particle size of 20 nm and a BET surface area of 50 $m^2/g$. AMT-600 has a crystal structure ratio of anatase 100%, an average particle size of 30 nm and a BET surface area of 52 $m^2/g$. TITANIX JA-1 has a crystal structure ratio of anatase 100%, an average particle size of 180 nm and a BET surface area of 9 $m^2/g$. Next, an operation for dispersing was conducted in a mixed liquid containing 300 mL of ion exchange water, 1.0 mL of nitric acid, 4.0 g of $TiO_2$ nanoparticles (ST-21), 3.0 g of $TiO_2$ nanoparticles (P-25), 2.0 g of $TiO_2$ nanoparticles (AMT-600) and 1.0 g of $TiO_2$ nanoparticles (TITANIX JA-1) as components by using a homogenizer, thereby a dispersion liquid of $TiO_2$ nanoparticles was prepared. Furthermore, 10.0 g of polyethylene glycol 2000 was added to this dispersion liquid of $TiO_2$ nanoparticles and the amount of water was adjusted to 8.0 g, thereby an SP paste containing $TiO_2$ nanoparticles dispersed therein was prepared.

<Preparation of Porous $TiO_2$ Thin Film (Coating of FTO Glass with $TiO_2$ Paste)>

First, FTO glass having a film of fluorine-doped tin oxide (manufactured by Asahi Glass Co., Ltd.; A110U80) was prepared. Next, this FTO glass was ultrasonic-cleaned subsequently in an aqueous solution of a neutral detergent, ion exchange water and methanol, and dried, and a cleaning treatment of the surface of the FTO glass using a washing apparatus $UV-O_3$ was conducted. At immediately after the cleaning treatment, a $TiCl_4$ treatment was conducted. The $TiCl_4$ treatment is conducted by immersing the FTO glass in 40 mmol/L of a $TiCl_4$ aqueous solution and retaining at 70° C. for 30 minutes, and thereafter washing with ion exchange water and ethanol. By conducting this $TiCl_4$ treatment, effects of improving the adhesion between the $TiO_2$ nanoparticles and FTO and to prevent the reverse electron transfer from the FTO to the electrolytic composition can be obtained.

Next, using a spin coating process and a screen printing process in combination, the FTO glass was coated with the dispersion paste of $TiO_2$ nanoparticles. To be specific, at first, the SC paste was applied to the $TiCl_4$-treated FTO glass by a spin coating process and calcinated. Next, the SP paste was applied to the spin-coated coating film by a screen printing process and calcinated. The porous $TiO_2$ thin film prepared by the above-mentioned method has a two-layer structure in which the layer prepared by the spin coating process constitutes a transparent layer (non-scatted layer) having a film thickness of 6.2 μm, and the layer prepared by the screen printing process has an opaque layer (scattered layer) having a film thickness of 10.3 μm, and thus an effective light confinement effect can be expected.

Next, a $TiCl_4$ treatment was conducted by the above-mentioned method on the two-layer porous $TiO_2$ thin film as prepared, and the thin film was then heated at 500° C. for 30 minutes.

<Adsorption of Sensitizing Dye on Substrate having Porous $TiO_2$ Thin Film>

As a sensitizing dye, a standard sensitizing dye cis-di(thiocyanato)-bis(2,2'-bipyridyl-4,4'-dicarboxylic acid)ruthenium (II) (Ruthenium 535; SOLARONIX) that is represented by the following structural formula and known as N3 dye was used.

[Chem. 3]

N3 dye

The chemical adsorption of the N3 dye on the surface of the porous $TiO_2$ thin film was conducted by heating the substrate having the porous $TiO_2$ thin film at 200° C. for 60 minutes, thereafter at the time when the temperature had decreased to 100° C., this substrate was immersed in an N3 dye solution (a 0.3 mmol/L ethanol solution; liquid temperature 70° C.) for 15 hours. Thereafter the substrate having the porous $TiO_2$ thin film that has adsorbed the dye was washed in ethanol and dried in the air to prepare a photoelectrode.

<Electrolytic Composition>

Next, seven kinds of electrolytic compositions A to G having different compositions of the additives for an electrolytic composition were prepared. The components as incorporated and the ratios thereof of the electrolytic compositions A to G are shown in the following Table 1. Furthermore, as the additives for an electrolytic composition, the pyridines represented by the following structural formulas were used.

TABLE 1

| | | Electrolytic composition | |
|---|---|---|---|
| Kind | Support electrolyte | Additive for electrolytic composition | Solvent |
| A | 0.05M $I_2$ 0.5M LiI | — | Acetonitrile |
| B | 0.05M $I_2$ 0.5M LiI | 0.5M Pyridine | Acetonitrile |
| C | 0.05M $I_2$ 0.5M LiI | 0.5M 4-(tert-Butyl)pyridine (4-TBpy) | Acetonitrile |
| D | 0.05M $I_2$ 0.5M LiI | 0.5M 4-(trimethylsilyl)pyridine (4-TMSpy) | Acetonitrile |
| E | 0.05M $I_2$ 0.5M LiI | 0.5M 3-(trimethylsilyl)pyridine (3-TMSpy) | Acetonitrile |
| F | 0.05M $I_2$ 0.5M LiI | 0.5M 3-(diisopropylsilyl)pyridine (3-DPSpy) | Acetonitrile |
| G | 0.05M $I_2$ 0.5M LiI | 0.5M 2-(trimethylsilyl)pyridine (2-TMSpy) | Acetonitrile |

Additives for Electrolytic Composition

[Chem. 4]

<Assembly of Open Cell>

Figure 4:
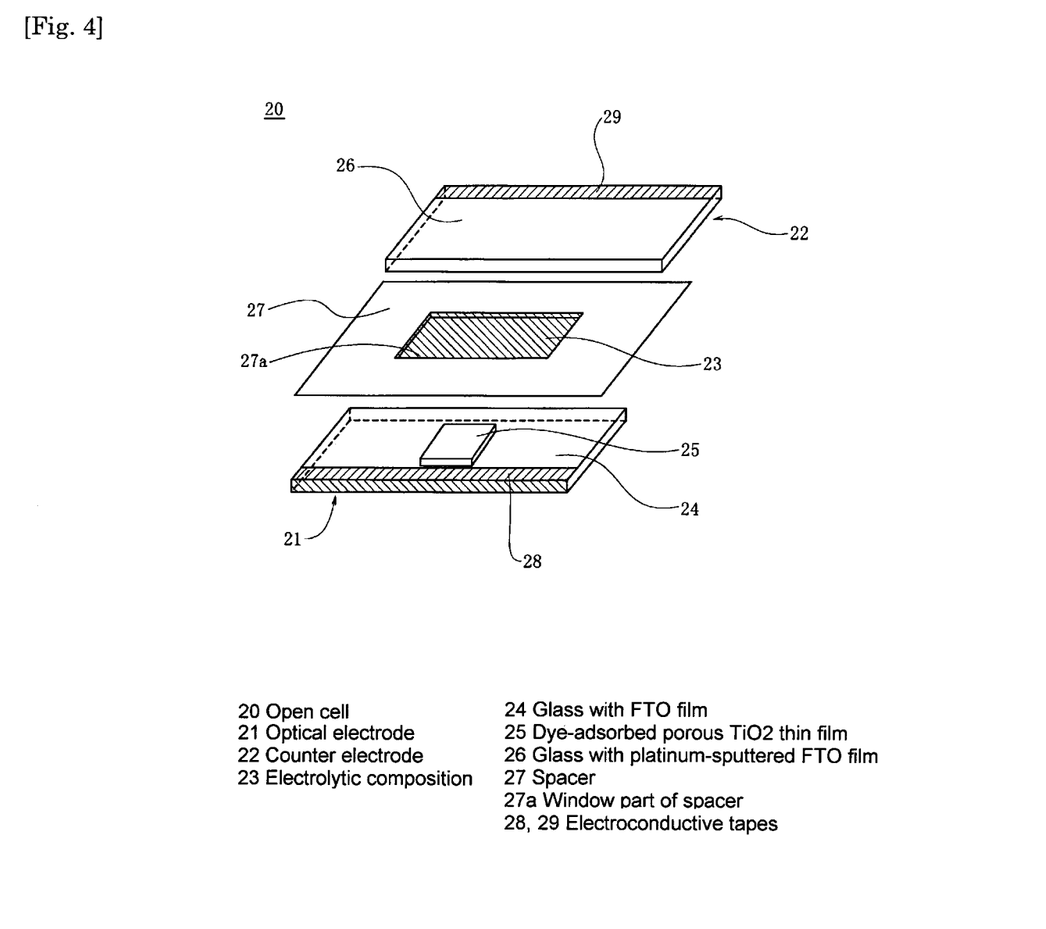
FIG. 4 is a constitutional drawing of a sandwich-type open cell that was prepared for evaluating the light power generation property of a dye-sensitized solar cell.

In order to evaluate the light power generation property of the dye-sensitized solar cell, a sandwich-type open cell 20 shown in FIG. 4 was prepared. Glass 24 with an FTO film in which a dye-adsorbed porous $TiO_2$ thin film 25 of 1.2 cm×1.2 cm having a thickness of 16.5 μm was formed on the center part was used as a photo electrode 21, and glass 26 with an FTO film on which platinum had been sputtered by a thickness of about 30 nm was used as a counter electrode 22. A polyethylene film having a thickness of 30 μm was used as a spacer 27, and a window part 27a of 15 mm×40 mm for injecting an electrolytic composition 23 was formed on the center part thereof. Furthermore, electroconductive copper foil tapes 28 and 29 were each attached by a width of 3 mm to the edge parts of the photoelectrode 21 and counter electrode 22.

<Evaluation of Light Power Generation Properties of Cells>

The light power generation properties of the cells prepared by using the electrolytic compositions A to G were evaluated by I-V curves under irradiation of light by using a light shield mask to adjust the aperture surface area of the cell to 12 0 mm square (1.44 $cm^2$). The I-V curves were each measured by vertically irradiating the cell with artificial solar light (Global-1 sun; AM-1.5G, 100 $mWcm^{-2}$) at 25±2° C. based on the Standard Test Conditions (STC) in the measurement of dye-sensitized solar cells.

A photoelectric conversion efficiency η was calculated from a short-circuit current density $J_{SC}$, an open circuit voltage $V_{OC}$ and a fill factor FF by using the following formula (3). The measurement accuracies of the respective parameters were ±0.02 mA $cm^{-2}$ for $J_{SC}$, ±0.002 V for $V_{OC}$ and ±0.005 for FF.

[Math. 3]

$$\eta \ (\%) = \frac{J_{sc} \ (\text{mA cm}^{-2}) \times V_{OC} \ (\text{V}) \times FF}{100 \ (\text{mW cm}^{-2})} \times 100 \quad (3)$$

Figure 5:
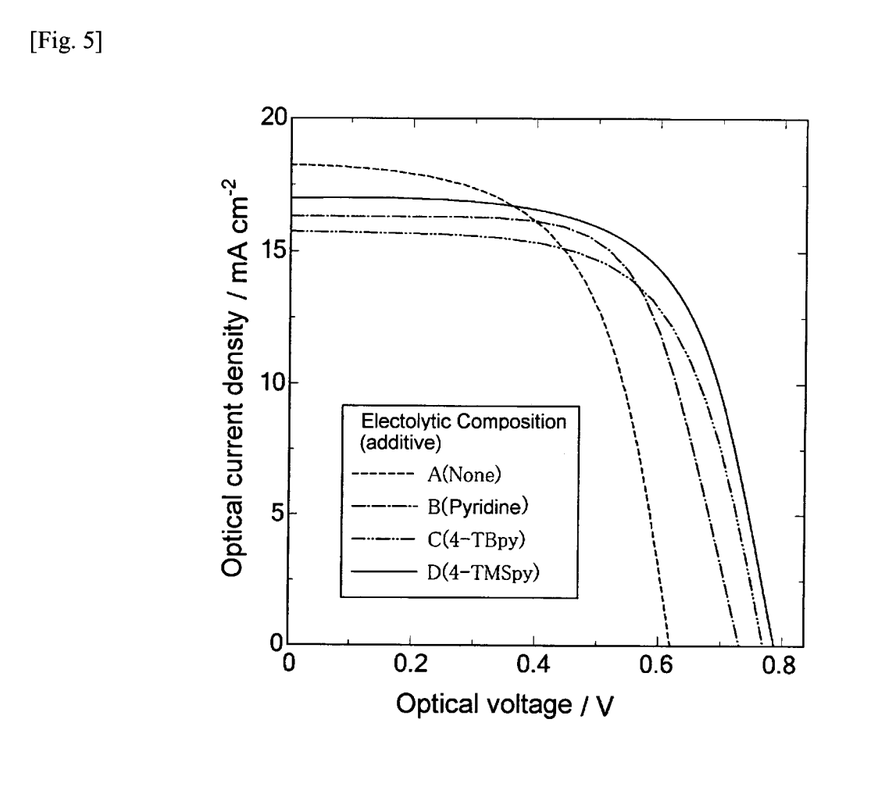
FIG. 5 is a drawing showing the I-V curves of the cells prepared by using the electrolytic compositions A to D under irradiation of artificial solar light.

The I-V property parameters of the cells prepared by using the electrolytic compositions A to G under irradiation of artificial solar light are shown in the following Table 2. Furthermore, the I-V property curves of the cells prepared by using the electrolytic compositions A to G under irradiation of artificial solar light are shown in FIG. 5.

TABLE 2

| Kind of electrolytic composition (kind of additive) | Short-circuit current density $J_{SC}$ [mAcm$^{-2}$] | Open circuit voltage $V_{OC}$ [V] | Fill factor FF | Photoelectric conversion efficiency η [%] |
|---|---|---|---|---|
| A (None) | 18.21 | 0.622 | 0.591 | 6.69 |
| B (Pyridine) | 16.30 | 0.732 | 0.653 | 7.79 |
| C (4-TBpy) | 15.72 | 0.770 | 0.659 | 7.98 |
| D (4-TMSpy) | 16.93 | 0.788 | 0.652 | 8.70 |
| E (3-TMSpy) | 17.53 | 0.705 | 0.621 | 7.67 |
| F (3-DPSpy) | 17.56 | 0.653 | 0.605 | 6.94 |
| G (2-TMSpy) | 17.68 | 0.682 | 0.609 | 7.34 |

As is apparent from Table 2, the photoelectric conversion efficiency η was 7.98% in the cell that was prepared by using the electrolytic composition C to which 4-TBpy that is currently considered to be the most effective for improving photoelectric conversion efficiency was added. This conversion efficiency is the world's best value as a dye-sensitized solar cell using N3 as a sensitizing dye and a commercial product for a photocatalyst as TiO$_2$ nanoparticles, and having a cell surface area of 1.0 cm$^2$ or more.

On the other hand, in the case when the electrolytic composition A being free from an additive for an electrolytic composition was used, increase in the short-circuit current density $J_{SC}$, decrease in the open circuit voltage $V_{OC}$ and fill factor FF, and following decrease in the photoelectric conversion efficiency η were observed as compared to the case when the electrolytic composition C to which 4-TBpy had been added was used.

Furthermore, also in the case when the electrolytic composition B to which pyridine had been added was used, increase in the short-circuit current density $J_{SC}$, decrease in the open circuit voltage $V_{OC}$ and fill factor FF, and following decrease in the photoelectric conversion efficiency n were observed as compared to the case when the electrolytic composition C to which 4-TBpy had been added was used, but the amounts of change thereof were smaller than those in the case of the electrolytic composition A.

Next, in the case when the electrolytic composition D to which 4-TMSpy into which a trimethylsilyl group is introduced into the 4-position of the pyridine ring was used, the increase of the short-circuit current density $J_{SC}$ and open circuit voltage $V_{OC}$ and a similar fill factor FF were observed as compared to the case when the electrolytic composition C to which the above-mentioned 4-TBpy had been added was used, and the photoelectric conversion efficiency η was improved by about 10% and became 8.70%. Furthermore, when compared with the case when the electrolytic composition A being free from an additive for an electrolytic composition, it was found that the open circuit voltage $V_{OC}$ and fill factor FF were improved significantly despite that decrease in the short-circuit current density $J_{SC}$ was relatively small, and thus it was clarified that 4-TMSpy has an ideal property for an additive for an electrolytic composition that it can significantly increase the open circuit voltage $V_{OC}$ and fill factor FF with little decrease of the short-circuit current density $J_{SC}$. It is interpreted that this high photoelectric conversion efficiency is due to (1) the increase of the electric dipole moment, (2) the increase of the molecular size, and (3) the rising of the HOMO level due to the introduction of an alkylsilyl group into the specific site of the pyridine ring, based on the elemental properties of silicon.

In addition, it was confirmed that, in the cases when the electrolytic compositions E to G to which 3-TMSpy, 3-DPSpy or 2-TMSpy having a pyridine ring into which an alkylsilyl group is introduced into the 2- or 3 position was added were used, decrease in the short-circuit current density $J_{SC}$ was small, the open circuit voltage was raised and the fill factor FF was improved as compared to the electrolytic composition A being free from an additive for an electrolytic composition, whereas the photoelectric conversion efficiency η was not improved sufficiently as compared to the case when the electrolytic composition B to which pyridine had been added was used and the case when the electrolytic composition C to which 4-TBpy had been added was used. From this fact, it is conjectured that there is a suitable position for introducing an alkylsilyl group into the pyridine ring.

Furthermore, when a similar evaluation to those mentioned above was conducted by using an electrolytic composition to which tetrahydrofuran (THF) had been co-added, further improvement of the photoelectric conversion efficiency was seen and a photoelectric conversion efficiency η=9.06% was achieved in the electrolytic composition D. This value was 10% or larger than the photoelectric conversion efficiency η=8.07% that was observed in the case when THF was co-added to the electrolytic composition C to which 4-TBpy had been added.

It was confirmed from these results that a high photoelectric conversion efficiency $_{it}$ can be obtained in a dye-sensitized solar cell that is prepared by using an electrolytic composition to which additive for an electrolytic composition containing 4-TMSpy having a trimethylsilyl group at the 4-position of the pyridine ring is added.

Example 2 and Comparative Example 2

<Preparation of Photoelectrode (TiO$_2$)>

First, the surface of an FTO glass substrate (2.5×5 cm) was wiped with Bemcot (manufactured by Asahi Kasei Fibers Corporation) and masked by using a masking tape (thickness 58 μm) into a size of 2.5×1.5 cm. Next, application was conducted by a squeezee process by using a titanium oxide powder (Ti-Nanoxide D, manufactured by Solaronix S. A.) suspended in water so as to be 10% by weight. The masking tape was peeled off, and this substrate was calcinated in an electric furnace at 450° C. to form a metal oxide semiconductor layer having a thickness of 5 μm. Subsequently, the metal oxide semiconductor layer prepared as above was immersed for 10 hours in a dye solution in which the dye and solvent described in Table 3 were prepared to 3×10-4M to adsorb the dye. After the adsorption, the excess dye on the surface was washed off with ethanol, and the layer was dried by a dryer.

<Preparation of Photoelectrode (ZnO)>

A zinc oxide paste (manufactured by Solar Co., Ltd.) was applied to a masked substrate by a spin coating (300 rpm, 1minute) process instead of the squeezee process using the titanium oxide powder in a similar manner to the preparation of the above-mentioned photoelectrode (TiO$_2$), and steps of drying at 120° C. for 10 minutes were repeated six times. The masking tape was peeled off, and the substrate was calcinated by an electric furnace at 450° C. to form a metal oxide semiconductor layer having a thickness of 5 μm. Subsequently, the metal oxide semiconductor layer prepared as above was immersed for 10 hours in a dye solution in which the dye and solvent described in Table 3 were prepared to 3×10-4M to adsorb the dye. After the adsorption, the excess dye on the surface was washed off with ethanol, and the layer was dried by a dryer.

TABLE 3

| Photoelectrode | Metal oxide semiconductor | Dye | Solvent |
| --- | --- | --- | --- |
| 1 | TiO$_2$ | Dye 1 | Ethanol |
| 2 | TiO$_2$ | Dye 2 | Toluene |
| 3 | ZnO | Dye 3 | Ethanol |
| 4 | TiO$_2$ | Dye 4 | Ethanol |
| 5 | TiO$_2$ | Dye 5 | Ethanol |
| 6 | TiO$_2$ | Dye 6 | Ethanol |
| 7 | TiO$_2$ | Dye 7 | Toluene |
| 8 | ZnO | Dye 7 | Toluene |

[Chem. 5]

Dye 1

Dye 2

-continued

Dye 3

Dye 4

Dye 5

Dye 6

Dye 7

<Electrolytic Composition>

The electrolytic compositions A, C, D and H to Y having different electrolyte concentrations, additives for an electrolytic composition and solvents were prepared. The components as incorporated and the ratios thereof of the electrolytic compositions are shown in the following Table 4.

TABLE 4

| | Electrolytic composition | | |
|---|---|---|---|
| Kind | Support electrolyte | Additive for electrolytic composition | Solvent |
| A | 0.05M $I_2$  0.5M LiI | — | Acetonitrile |
| C | 0.05M $I_2$  0.5M LiI | 0.5M 4-TBpy | Acetonitrile |
| D | 0.05M $I_2$  0.5M LiI | 0.5M 4-TMSpy | Acetonitrile |
| H | 0.2M $I_2$  0.1M LiI | 0.6M DMPII | Acetonitrile |
| I | 0.2M $I_2$  0.1M LiI | 0.5M 4-TBpy + 0.6M DMPII | Acetonitrile |
| J | 0.2M $I_2$  0.1M LiI | 0.5M 4-TMSpy + 0.6M DMPII | Acetonitrile |
| K | 0.05M $I_2$  0.5M LiI | — | 3-MPN |
| L | 0.05M $I_2$  0.5M LiI | 0.5M 4-TBpy | 3-MPN |
| M | 0.05M $I_2$  0.5M LiI | 0.5M 4-TMSpy | 3-MPN |
| N | 0.4M $I_2$  0.1M LiI | — | PMII |
| O | 0.4M $I_2$  0.1M LiI | 0.5M 4-TBpy | PMII |
| P | 0.4M $I_2$  0.1M LiI | 0.5M 4-TMSpy | PMII |
| Q | 0.01M $I_2$  0.5M LiI | — | Acetonitrile |
| R | 0.01M $I_2$  0.5M LiI | 0.5M 4-TBpy | Acetonitrile |
| S | 0.01M $I_2$  0.5M LiI | 0.5M 4-TMSpy | Acetonitrile |
| T | 0.2M $I_2$  0.5M LiI | — | Acetonitrile |
| U | 0.2M $I_2$  0.5M LiI | 0.5M 4-TBpy | Acetonitrile |
| V | 0.2M $I_2$  0.5M LiI | 0.5M 4-TMSpy | Acetonitrile |
| W | 0.4M $I_2$  0.5M LiI | — | Acetonitrile |
| X | 0.4M $I_2$  0.5M LiI | 0.5M 4-TBpy | Acetonitrile |
| Y | 0.4M $I_2$  0.5M LiI | 0.5M 4-TMSpy | Acetonitrile |

DMPII: 1,2-dimethyl-3-propylimidazolium iodide
3-MPN: 3-methoxypropionitrile
PMII: 1-methyl-3-propylimidazolium iodide <Assembly of Ppen Cell>

Using the photoelectrode in Table 3 and the electrolytic composition in Table 4 in the combination in the following Table 5, a sandwich-type open cell 20 shown in FIG. 4 was prepared in a similar manner to that in <Assembly of open cell> in Example 1.

<Evaluation of Light Power Generation Property of Cell>

The light power generation property of the assembled open cell was evaluated by an I-V curve under irradiation of light by using a light shield mask to adjust the aperture surface area of the cell to 1 cm². The I-V curve was measured in a similar manner to that in Example 1 based on the Standard Test Conditions (STC) in the measurement of dye-sensitized solar cells. In order to show the ability of suppressing the decrease of the short-circuit current, the short-circuit current value in the case when the pyridine-based additive was added is shown as a relative ratio in Table 5, with defining the short-circuit current value in the case when an electrolytic composition to which no pyridine-based additive (4-TBpy or 4-TMSpy) is added (electrolytic compositions A, H, K and N) is used as 1. The brackets in the table show the kind of the electrolytic composition.

TABLE 5

| | No additive | 4-TBpy | 4-TMSpy |
|---|---|---|---|
| Photoelectrode 1 | 1.00 (A) | 0.58(C) | 0.82(D) |
| Photoelectrode 1 | 1.00 (H) | 0.85(I) | 0.87(J) |
| Photoelectrode 1 | 1.00 (K) | 0.90(L) | 0.96(M) |
| Photoelectrode 1 | 1.00 (N) | 0.76(O) | 0.79(P) |
| Photoelectrode 1 | 1.00 (Q) | 0.73(R) | 0.78(S) |
| Photoelectrode 1 | 1.00 (T) | 0.84(U) | 0.92(V) |
| Photoelectrode 1 | 1.00 (W) | 0.56(X) | 0.73(Y) |

TABLE 5-continued

| | No additive | 4-TBpy | 4-TMSpy |
|---|---|---|---|
| Photoelectrode 2 | 1.00 (A) | 0.91(C) | 0.95(D) |
| Photoelectrode 2 | 1.00 (H) | 0.47(I) | 0.55(J) |
| Photoelectrode 2 | 1.00 (K) | 0.86(L) | 0.88(M) |
| Photoelectrode 2 | 1.00 (N) | 0.72(O) | 0.75(P) |
| Photoelectrode 3 | 1.00 (A) | 0.99(C) | 1.12(D) |
| Photoelectrode 4 | 1.00 (A) | 0.71(C) | 0.86(D) |
| Photoelectrode 5 | 1.00 (A) | 0.97(C) | 1.13(D) |
| Photoelectrode 6 | 1.00 (A) | 0.34(C) | 0.67(D) |
| Photoelectrode 7 | 1.00 (A) | 0.45(C) | 0.65(D) |
| Photoelectrode 8 | 1.00 (A) | 0.63(C) | 0.87(D) |

In the results in Table 5, it is apparent that the decrease of the short-circuit current can be prevented more by using 4-TMSpy as an additive as compared to 4-TBpy, even in the cases when the photoelectrode 1 is used and the composition of the electrolyte is changed. Furthermore, it is also apparent that the decrease of the short-circuit current can be prevented more by using 4-TMSpy as an additive as compared to 4-TBpy also in the cases when the dye and metal oxide semiconductor are changed.

It is obvious from above that a pyridine derivative into which an alkylsilyl group is introduced is preferable as an additive for an electrolytic composition for use in a dye-sensitized solar cell.

REFERENCE SIGNS LIST

10 Dye-sensitized solar cell
11 Photoelectrode
12 Counter electrode
13 Electrolytic composition

The invention cliamed is:

1. A dye-sensitized solar cell, which uses an electrolytic composition comprising support electrolyte comprising $I_2$ and LiI, and an additive comprising 4-(trimethylsilyl)pyridine (4-TMSpy)

4-TMS py

2. The dye-sensitized solar cell according to claim 1, comprising
   solvent,
   0.1 to 1 mol/L of said support electrolyte, and
   0. 1 to 1 mol/L of said additive, 4-(trimethylsilyl) pyridine (4-TMSpy)

4-TMS py with respect to the solvent.

3. The dye sensitized solar cell according to claim 2, comprising acetonitrile as solvent, 0.05M $I_2$ and 0.5M LiI as support electrolytes, and 0.5M of 4-TMSpy.

4. The dye sensitized solar cell according to claim 2, wherein the solvent comprises at least one selected from the group consisting of ethanol, t-butylalcohol, acetonitrile, methoxyacetonitrile, 3-methoxypropionitrile, ethylene carbonate, ethyl carbonate, and methyl carbonate.

* * * * *